US008612227B2

(12) United States Patent
Kato

(10) Patent No.: US 8,612,227 B2
(45) Date of Patent: Dec. 17, 2013

(54) METHOD AND EQUIPMENT OF PATTERN RECOGNITION, ITS PROGRAM AND ITS RECORDING MEDIUM FOR IMPROVING SEARCHING EFFICIENCY IN SPEECH RECOGNITION

(75) Inventor: Tsuneo Kato, Saitama (JP)

(73) Assignee: KDDI Corporation, Tokyo (JP)

( * ) Notice: Subject to any disclaimer, the term of this patent is extended or adjusted under 35 U.S.C. 154(b) by 666 days.

(21) Appl. No.: 12/841,416

(22) Filed: Jul. 22, 2010

(65) Prior Publication Data

US 2011/0022385 A1 Jan. 27, 2011

(30) Foreign Application Priority Data

Jul. 23, 2009 (JP) ................................ P2009-172170

(51) Int. Cl.
*G10L 15/14* (2006.01)

(52) U.S. Cl.
USPC .......................... 704/256.5; 704/251; 704/256

(58) Field of Classification Search
USPC .................................... 704/251, 256.1, 256.5
See application file for complete search history.

(56) References Cited

U.S. PATENT DOCUMENTS

| | | | | |
|---|---|---|---|---|
| 5,349,645 | A * | 9/1994 | Zhao ............................. | 704/243 |
| 5,677,990 | A * | 10/1997 | Junqua .......................... | 704/255 |
| 5,699,456 | A * | 12/1997 | Brown et al. ................. | 382/226 |
| 5,706,397 | A * | 1/1998 | Chow ............................ | 704/243 |
| 5,983,180 | A * | 11/1999 | Robinson ...................... | 704/254 |
| 6,006,181 | A * | 12/1999 | Buhrke et al. ................. | 704/231 |
| 6,285,981 | B1 * | 9/2001 | Kao ............................... | 704/256 |
| 6,374,219 | B1 * | 4/2002 | Jiang ............................ | 704/255 |
| 6,442,520 | B1 * | 8/2002 | Buhrke et al. ................. | 704/255 |
| 2005/0143995 | A1 * | 6/2005 | Kibkalo et al. ............... | 704/242 |
| 2005/0159952 | A1 * | 7/2005 | Nguyen et al. ................ | 704/243 |
| 2008/0077404 | A1 * | 3/2008 | Akamine et al. .............. | 704/243 |
| 2009/0099841 | A1 * | 4/2009 | Chen ................................ | 704/9 |
| 2010/0198597 | A1 * | 8/2010 | Zhu ................................ | 704/236 |

OTHER PUBLICATIONS

Young "Acoustic Modelling for Large Vocabulary Continuous Speech Recognition", Proc NATO Advance Study Institute. Editor: Keith Ponting, Springer-Verlag, 1999.*
Pylkkonen, J.; "New Pruning Criteria for Efficient Decoding"; Proceedings of ICSLP 2005, ISCA, 9th European Conference on Speech Communication and Technology ( Sep. 4, 2005).
Ortmanns, S. et al.; "Language-Model Look Ahead for Large Vocabulary Speech Recognition"; Proceeding of ICSLP 96, Fourth International Conference on Spoken Language Processing (Oct. 3, 1996).

* cited by examiner

*Primary Examiner* — Jialong He
(74) *Attorney, Agent, or Firm* — Westerman, Hattori, Daniels & Adrian, LLP

(57) ABSTRACT

The present invention provides a method and equipment of pattern recognition capable of efficiently pruning partial hypotheses without lowering recognition accuracy, its pattern recognition program, and its recording medium. In a second search unit, a likelihood calculation unit calculates an acoustic likelihood by matching time series data of acoustic feature parameters against a lexical tree stored in a second database and an acoustic model stored in a third database to determine an accumulated likelihood by accumulating the acoustic likelihood in a time direction. A self-transition unit causes each partial hypothesis to make a self-transition in a search process. An LR transition unit causes each partial hypothesis to make an RL transition. A reward attachment unit adds a reward R(x) in accordance with the number of reachable words to each partial hypothesis to raise the accumulated likelihood. A pruning unit excludes partial hypotheses with less likelihood from search targets.

8 Claims, 8 Drawing Sheets

Fig. 9

Related Art

| PRECEDING WORD | FOLLOWING WORD | CONDITIONAL PROBABILITY |
|---|---|---|
| [1]sil | [5]kuji | 0.050 |
| [1]sil | [3]kaisha | 0.020 |
| [1]sil | [4]kaimono | 0.010 |
| ... | ... | ... |
| [5]kuji | [8]ni | 0.100 |
| [5]kuji | [x]kara | 0.100 |
| ... | ... | ... |
| [3]kaisha | [8]ni | 0.050 |
| ... | ... | ... |
| [4]kaimono | [6]shite | 0.020 |
| ... | ... | ... |
| [8]ni | [2]kaeri | 0.002 |
| ... | ... | ... |
| [2]kaeri | [7]masu | 0.100 |
| ... | ... | ... |
| [7]masu | [1]sil | 0.200 |

METHOD AND EQUIPMENT OF PATTERN RECOGNITION, ITS PROGRAM AND ITS RECORDING MEDIUM FOR IMPROVING SEARCHING EFFICIENCY IN SPEECH RECOGNITION

The present application is claims priority of Japanese Patent Application Serial No. 2009-172170, filed Jul. 23, 2009, the content of which is hereby incorporated by reference in its entirety.

BACKGROUND OF THE INVENTION

1. Field of the Invention

The present invention relates to pattern recognition that matches feature parameters of an input signal against a finite state machine in which a recognition pattern is represented as a path like a tree structure leading from a root to leaf nodes to adopt the most likely state transition path reaching the leaf node as a recognition result, and in particular, relates to pattern recognition suitable for speech recognition.

2. Description of the Related Art

Speech recognition is formulated as a process that determines the most likely word sequence from among predefined chainable word sequences for speech data in time sequence. In a speech recognition engine based on the HMM (Hidden Markov Model), a search is performed at two levels of (1) a step of searching for a word sequence constituting a sentence in a word-level network and (2) a step of searching for likely words with a start time and end time in sub-phoneme HMM-level network.

In the step in (2), each word is represented as an HMM sequence. In most cases, a word is decomposed into a phoneme sequence according to its reading and an HMM sequence of the word is constituted by linking phoneme HMM prepared for each phoneme. FIG. 7 is a diagram exemplifying linear HMM sequences.

A word search is performed based on the Viterbi algorithm on HMM sequences. A hypothesis, a candidate of recognition results, enters the first state of an HMM sequence at a start time (the next time after the end time of the previous word) and comes out of the state at the end of the HMM sequence. The Viterbi algorithm outputs the degree of matching between speech data and acoustic features of the HMM sequence in a period between the time when the hypothesis enters the HMM sequence and the time when the HMM sequence comes out of the HMM sequence as a probability value. More precisely, the probability value is represented by a logarithmic likelihood ($L=\log P$) and is called an acoustic likelihood.

Words are not yet determined during recognition processing and the Viterbi algorithm is executed simultaneously in parallel on HMM sequences of various words. That is, a hypothesis that saves the acoustic likelihood at that point is temporarily stored in each of states of HMM sequences of various words. Such hypotheses are called "partial hypotheses".

In actual speech recognition, vast kinds of word sequences are searched and thus, the number of partial hypotheses is vast. To reduce the number of partial hypotheses, the common partial HMM sequences from the beginning are merged between different words. This is because if the search of the common partial HMM sequences is started at the same time even between different words, the "acoustic likelihood" of each state of the common portion is the same. A "lexical tree" as shown in FIG. 8 is formed by this merging.

However, even if such a "lexical tree" of words to be recognized is formed, the number of partial hypotheses increases explosively. Thus, processing of "pruning" that compares likelihoods of all partial hypotheses at each time to leave only partial hypotheses with a greater likelihood for a search in the next time frame and to discard partial hypotheses with smaller likelihood every time frame of the search process is normally performed. Typical pruning techniques include pruning based on a fixed beam width that leaves partial hypotheses within a fixed likelihood width from the greatest likelihood of all partial hypotheses and pruning based on the maximum number of partial hypotheses that leaves a fixed number of partial hypotheses from partial hypotheses with a great likelihood and both techniques are generally used together.

On the other hand, the step in (1) is roughly classified into speech recognition based on a context free grammar and speech recognition based on a probabilistic language model.

In speech recognition based on a context free grammar, a set of sentences accepted by a speech recognition engine is prepared as a network of words. This is called a "grammar" and an example thereof is shown in FIG. 3. In speech recognition processing, the search is started from the first node of the grammar to search for the first word. The search of word is performed in the step in (2). If one of partial hypotheses comes out of the state of word end in the step in (2), a word-level hypothesis called "word hypothesis" attached to a transition destination of the network in the step in (1) is added to the collection of those "word hypotheses". The word hypotheses have the ID of the word, start time, end time, ID of the transition source, accumulated likelihood from the speech start to that point stored therein.

In the next time frame after word hypotheses being generated, the search of all words starting from the node is started by the step in (2). With the step in (1) and the step in (2) being repeated with the passage of time in this manner, the whole search space defined by the grammar is searched. In the end, among word hypotheses that have reached a terminal of sentence of the grammar, a word history that has led to a hypothesis with the greatest accumulated likelihood is output as a recognition result.

In speech recognition based on a probabilistic language model, instead of the context free grammar, a "probabilistic language model" is used. Normally, a model called "N-gram" that defines a conditional probability of the last word under the condition of N−1 preceding words for various combinations chaining of several (N) words is used. N-gram that uses chaining of two words is called "bigram" and N-gram that uses chaining of three words is called "trigram". FIG. 9 is a diagram exemplifying bigram.

No search space is prepared as a network for speech recognition based on a probabilistic language model, but like speech recognition based on a context free grammar, the search is started from a silence (sil) at the start of sentence using a hypothesis and the search terminates for the hypothesis that has reached the terminal state of a silence (sil) at the end of sentence. As the likelihood used for determining a final recognition result or as a reference for pruning, an aggregate value of an accumulated linguistic likelihood held by the probabilistic language model and the accumulated acoustic likelihood is used.

In S. Ortmanns, H. Ney and A. Eiden, "Language-Model Look-Ahead for Large Vocabulary Speech Recognition" Proceedings of ICSLP 96 (1996), "linguistic likelihood look-ahead" in speech recognition based on a probabilistic language model is proposed. While the linguistic likelihood given by N-gram is determined when the word being searched for is determined, in order to reflect the linguistic likelihood in search processing as soon as possible, the greatest linguistic likelihood among a plurality of words that can be reached from every branch node in a lexical tree is temporarily added to the accumulated likelihood.

In speech recognition using, for example, the lexical tree in FIG. 8 and the probabilistic language model in FIG. 9, log 0.050 obtained as a logarithm of the linguistic probability 0.050 of "sil-kuji (nine o'clock in Japanese)", which is the maximum value of linguistic probabilities of "sil-kuji", "sil-kaisha (company in Japanese)", and "sil-kaimono (shopping in Japanese)", is added to partial hypotheses searching for the initial letter /k/ of the word subsequent to the silence (sil) at the start of sentence. Discarding log 0.050 before branching, log 0.020 obtained as a logarithm of 0.020 of "sil-Kaisha", which is the maximum value of linguistic probabilities of "sil-Kaisha" and "sil-Kaimono", is added to partial hypotheses searching for /a/ after /k/ beyond the initial branching. Discarding log 0.020, log 0.010 is added to partial hypotheses that have reached /m/ of "Kaimono". The search of the lexical tree progresses in this manner and words are increasingly narrowed down as partial hypotheses approach leaves so that more accurate linguistic probabilities are given. The effect of the "linguistic likelihood look-ahead" is very profound and S. Ortmanns, H. Ney and A. Eiden, "Language-Model Look-Ahead for Large Vocabulary Speech Recognition" Proceedings of ICSLP 96 (1996) reports that the processing time of a dictation task has been reduced to ⅓₀.

In J. Pylkkonen, "New Pruning Criteria for Efficient Decoding" Proceedings of ICSLP 2005 (2005), Equal Depth Pruning (pruning depending on the depth of a lexical tree) is proposed as a relatively new pruning technique. In this Equal Depth Pruning, in order to leave partial hypotheses present in various depths from states near the root to states near leaves without exception in pruning based on the likelihood, instead of using the greatest likelihood of all partial hypotheses as a reference, the greatest likelihood to be a reference is determined for each depth (the number of states from the root) so that pruning processing is performed based on a fixed beam width for each depth.

The "language model look-ahead" in S. Ortmanns, H. Ney and A. Eiden, "Language-Model Look-Ahead for Large Vocabulary Speech Recognition" Proceedings of ICSLP 96 (1996) brings about a very profound effect in efficiently searching a lexical tree. However, the technique cannot be used for speech recognition based on a context free grammar having no linguistic probability.

"Equal depth pruning" in J. Pylkkonen, "New Pruning Criteria for Efficient Decoding" Proceedings of ICSLP 2005 (2005) is a pruning technique that can also be used for speech recognition based on a context free grammar. However, the likelihood to be a reference for pruning at each time frame is determined for each of depths ranging from one to several tens in a lexical tree as the greatest likelihood of a set of target partial hypotheses, which destabilizes performance and makes the reduction in the number of partial hypotheses to the limit difficult.

SUMMARY OF THE INVENTION

An object of the present invention is to provide a method and equipment of pattern recognition capable of efficiently pruning partial hypotheses without lowering a recognition rate, its pattern recognition program, and its recording medium.

To achieve the above object, the present invention is characterized in that the following measures shown below are taken in pattern recognition equipment that matches feature parameters of an input signal against a finite state machine in which a recognition pattern is represented as a path like a tree structure leading from root to leaf node to adopt the most likely state transition path reaching the leaf node as a recognition result.

(1) A unit that calculates a likelihood of the feature parameters for each state of the finite state machine by matching the feature parameters of the input signal against the finite state machine, a unit that calculates a reward according to a number of reachable leaf nodes from each state, and a pruning unit that compares aggregate values of an accumulated likelihood and the reward of partial hypotheses in each state at predetermined intervals to exclude partial hypotheses with lower aggregate values from search targets are included.

(2) The unit configured to calculate the likelihood calculates the likelihood in each state of a transition destination by causing the partial hypotheses in each state of the finite state machine to make a self-transition and an L-R transition and the unit configured to calculate the reward calculates/updates the reward in the L-R transition to a node after branching from the root node of the tree structure.

(3) The unit configured to calculate the reward calculates the reward by using a monotonously increasing function that asymptotically approaches a fixed value with an increasing number of reachable leaf nodes.

(4) The unit configured to calculate the reward sets the reward "0" when the number of reachable leaf nodes is "1".

(5) The finite state machine of the tree structure is a lexical tree of words.

(6) A special reward can exceptionally be set without following the monotonously increasing function depending on the type of words.

According to the present invention, effects as shown below are achieved.

(1) The reward that increases in value with an increasing number of leaf nodes reachable from each state is calculated for each state of the finite state machine and added to the accumulated likelihood of each state and pruning is performed based on the aggregate value and therefore, the likelihood for a state with a large number of reachable leaf nodes is raised. As a result, situations in which the search space is narrowed down after states with a large number of reachable leaf nodes being pruned in an early stage can be reduced.

(2) The reward is calculated/updated in the L-R transition to a node after branching and therefore, the number of times of reward updates can be reduced to a minimum so that the processing load of pattern recognition can be reduced.

(3) The reward is calculated by using a monotonously increasing function with a small number of parameters and thus, the optimization of the reward with respect to the number of reachable leaf nodes is made easier.

(4) The reward when the number of reachable leaf nodes is "1" is set to "0" and thus, the probabilistic framework of the pattern recognition is maintained without being pulled down.

(5) Pruning of speech recognition processing based on the lexical tree can efficiently be performed.

(6) The relationship between the number of reachable leaf nodes and the reward can be made different according to the type of words and thus, the reward can be optimized by considering exceptions.

BRIEF DESCRIPTION OF THE DRAWINGS

FIG. 9 is a diagram showing an example of a probabilistic language model (bigram).

DETAILED DESCRIPTION OF THE PREFERRED EMBODIMENT

An embodiment of the present invention will be described below in detail with reference to drawings. First, a basic idea of the present invention will be described and then, an embodiment thereof will be described in detail with reference to a block diagram and a flow chart.

A tree structure in which a recognition pattern is represented by a path leading from a root node to a plurality of leaf nodes is constituted of a small number of a root node and nodes near the root node that can reach a large number of leaves and a large number of nodes from which the reachable leaf is determined or for which the number of reachable leaves is limited to several leaves.

Partial hypotheses to be pruned include a small number of partial hypotheses present in nodes near the root and a large number of partial hypotheses present in nodes near leaves. If an effect of pruning is considered, pruning most of the small number of partial hypotheses near the root has a great influence because possibilities of reaching various leaves may be lost all at once. On the other hand, pruning partial hypotheses present in nodes near leaves has a small influence because only possibilities of reaching limited leaves are lost.

Figure 1:
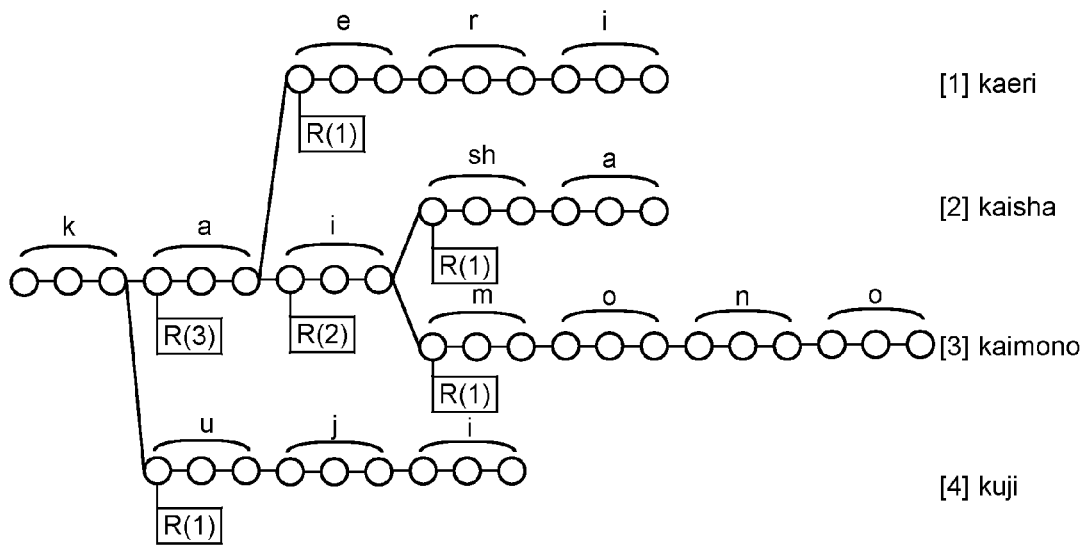
FIG. 1 is diagram showing an example of a method of adding a reward in pattern recognition using a lexical tree.

Describing more specifically with reference to FIG. 1, in a lexical tree of four words "kaeri (return in Japanese)", "kaisha (company in Japanese)", "kaimono (shopping in Japanese)", and "kuji (nine o'clock in Japanese)" beginning with a phoneme "k", the word beginning with a phoneme "ku" is limited to "kuji" and thus, if partial hypotheses passes through the search space of the phoneme "ku", the word is determined. By contrast, three words "kaeri", "kaisha", and "kaimono" begin with a phoneme "ka" and the word is not determined even after the search space of the phoneme "ka" is passed through.

Here, if all partial hypotheses that make a self-transition or LR transition at some time should be pruned, only n upper-level partial hypotheses determined by the beam width or the maximum number of permissible hypotheses are left according to conventional technology. In this case, in order to retail the possibility that partial hypotheses reach many words, it is desirable to make the partial hypotheses remain among the n upper-level partial hypotheses without omission in a wide range of the search space. However, only partial hypotheses and in such a case, the possibility of reaching many words is lost at a time.

That is, if all partial hypotheses of the phoneme "ka" in FIG. 1 should be pruned, three words "kaeri", "kaisha", and "kaimono" are excluded from the search space at that point and the word "kuji" inevitably becomes a search result.

In the present invention, pruning by adding a temporary reward according to the number of reachable leaves to the likelihood is considered by taking notice of the fact that the number of leaves that can be reached from nodes near the root is large, the number of reachable leaves decreases as leaves come closer, and the number of reachable leaves becomes "1" when the leaf is determined.

In other words, in the present invention, in order to prevent partial hypotheses with wide search space from being pruned in an early stage, making pruning more difficult with an increasing width of search space by giving a more reward to partial hypotheses with wider search space and adding such a reward to the accumulated likelihood is considered.

Figure 2:
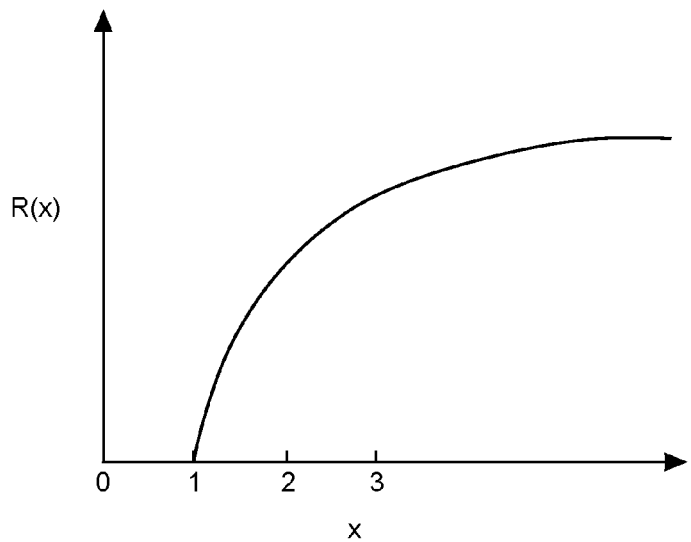
FIG. 2 is diagram showing an example in which the reward R(x) monotonously increases according to a number x of reachable leaf nodes.

Then, in the present invention, the number x of leaf nodes (here, the number of words) reachable from each state and the reward R(x) according to the number x of leaf nodes are set and the relationship between the number x of leaf nodes and the reward R(x) is defined as a monotonously increasing function as shown, for example, in FIG. 2. Further, more specifically, in the present embodiment, the relationship between the number x of leaf nodes and the reward R(x) is defined as a function whose reward R(x) is "0" when the number x of reachable leaf nodes is "1" and which monotonously increases and asymptotically approaches a fixed value when the number x of reachable leaf nodes is in a range greater than "1".

In the example shown in FIG. 1, the number x of reachable leaf nodes for partial hypotheses of the phoneme [ka] is 3, "kaeri", "kaisha", and "kaimono", and the reward R(3) is granted. For partial hypotheses of the phoneme [ku], the number x of reachable leaf nodes is 1, "kuji", and the reward R(1) is granted. For partial hypotheses of the phoneme [kai], the number x of reachable leaf nodes is 2, "kaisha" and "kaimono", and the reward R(2) is granted.

Figure 3:
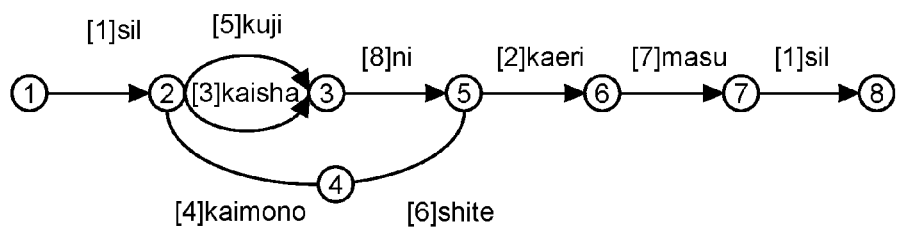
FIG. 3 is diagram showing an example of a context free grammar.
Figure 3:
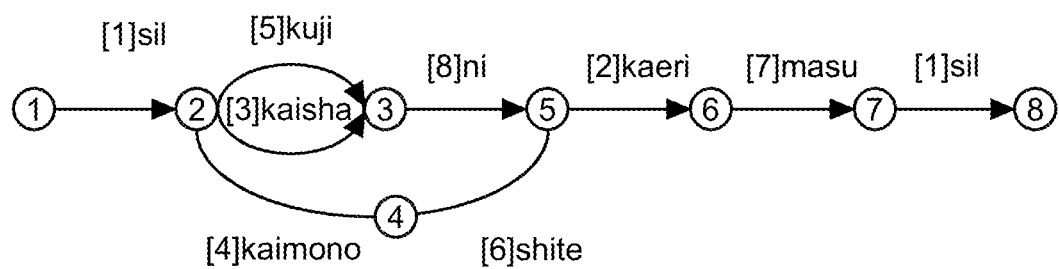
Figure 4:
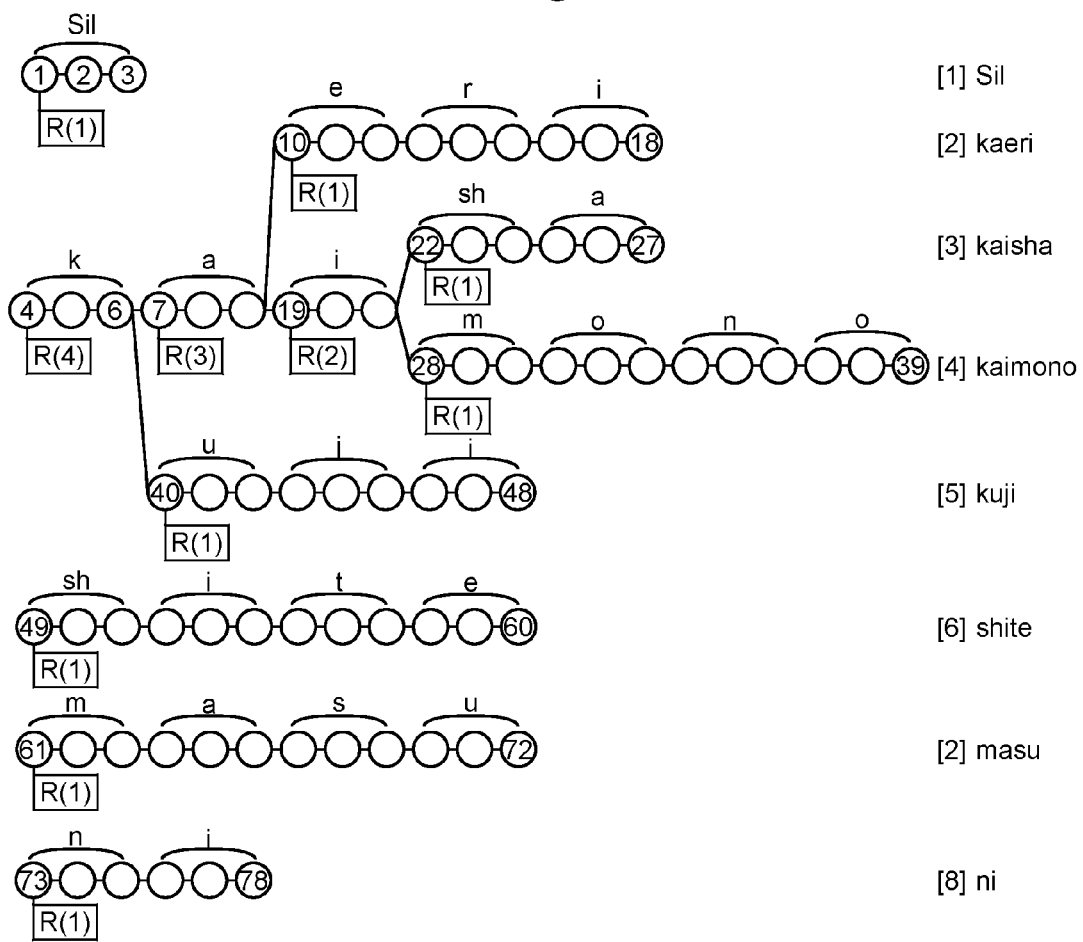
FIG. 4 is a diagram of another example of the method of adding the reward in pattern recognition using the lexical tree.

If the context free grammar is as shown in FIG. 3, as shown in FIG. 4, partial hypotheses proceed in parallel for the lexical tree of words "sil (silence)", "site", "masu", and "ni" other than the above and thus, the reward R(1) is granted to each partial hypothesis whose number x of reachable leaf nodes is "1" like the phonemes [sil], [sh], [m], and [n] and the reward R(4) to partial hypotheses whose number x of reachable leaf nodes is "4" like the phoneme "k".

In the present invention, a function whose reward becomes "0" when the number x of reachable leaf nodes is "1" is defined. When a leaf node is determined as the search approaches a leaf, the reward added to the likelihood becomes "0" so that a probabilistic framework of search is maintained without being pulled down. More precisely, the number of reachable leaf nodes may be greater than 1 even in a leaf node in the case of a homonym in speech recognition or a different word having a prefix of the same sound, but the reward that is not "0" even in such a case can be corrected to "0" when word hypotheses are output.

The relationship between the number x of leaf nodes and the reward R(x) is not limited to one relationship and while the relationship in FIG. 2 is defined for a speech model, a different relationship may exceptionally be defined for a special acoustic model such as a silence model and a noise model.

That is, "silence" and various kinds of "noise" (for example, sound of a passing car) are recognized as a kind of word and the silence model and noise model are prepared together with the speech model. In the silence model or noise model, there is no node shared by other models and the number of reachable words is "1" from the beginning to the end so that the reward becomes always "0" regarding the relationship in FIG. 2. However, after silence/noise at the start of sentence or in a sentence, there is generally the possibility of developing into a variety of expressions (across words) and thus, performance is improved if pruning of hypotheses in the search for silence/noise is made less strict. Thus, a relationship that exceptionally grants a reward that is not "0" only to special words that do not branch such as silence/noise may also be separately provided.

Figure 5:
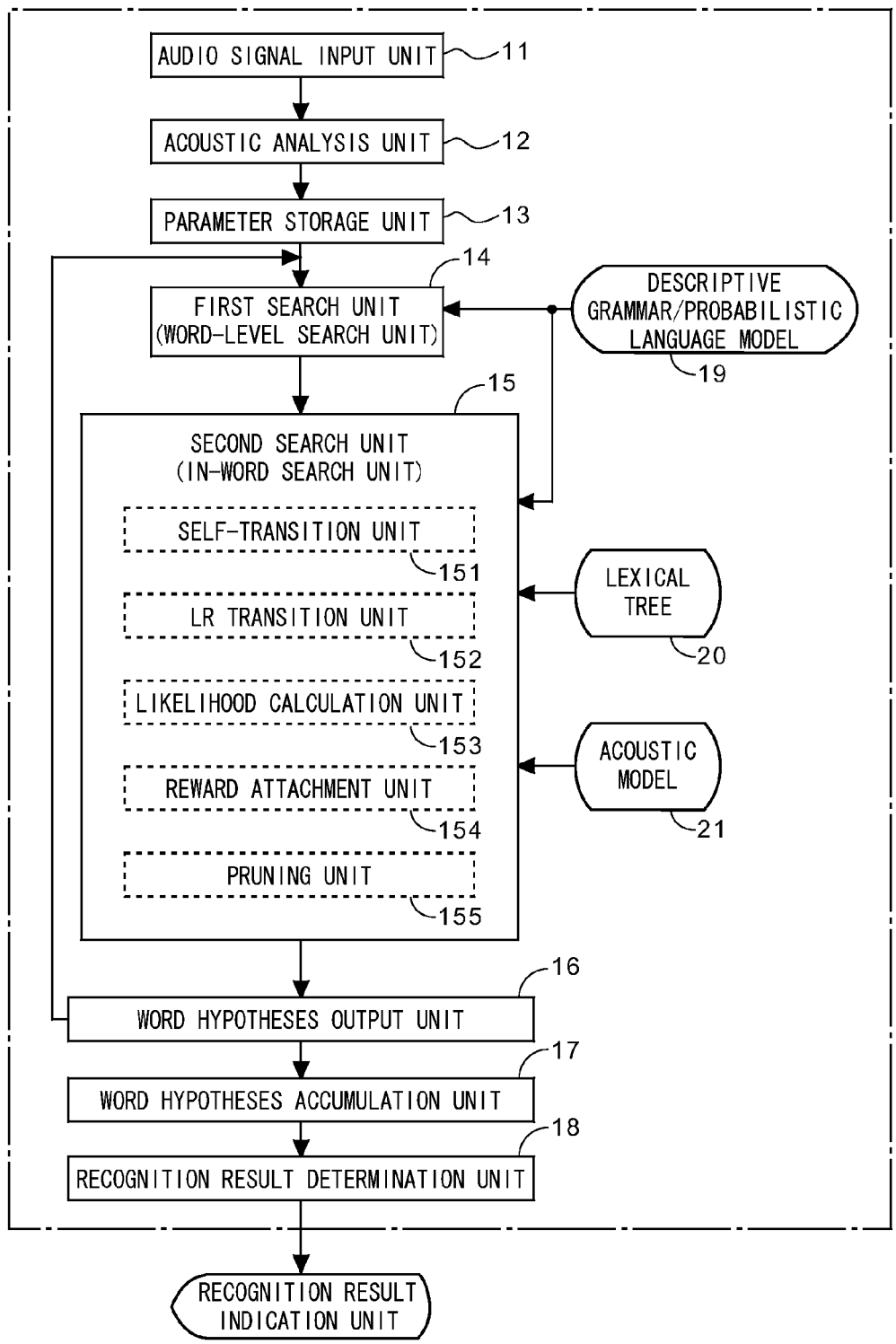
FIG. 5 is a function block diagram showing a configuration of main units of a speech recognition equipment to which the present invention is applied.

Next, an embodiment of the present invention will be described in detail. FIG. 5 is a block diagram showing the configuration of main units of a speech recognition equipment to which pattern recognition of the present invention is applied.

An audio signal input unit 11 converts an input audio signal into a digital signal. An acoustic analysis unit 12 performs an acoustic analysis of the audio digital signal to extract acoustic feature parameters, which are temporarily stored in a parameter storage unit 13. Acoustic feature parameters are a feature vector obtained by analyzing an input speech at regular intervals (for example, 10 ms; hereinafter, denoted as frames). Therefore, the audio signal is converted into a time series $X=x1, x2, \ldots, xt$ of the feature vector. Therefore, a first search unit (word-level search unit) 14 searches for a word sequence constituting a sentence using each word as a unit based on a context free grammar/probabilistic language model stored in a first database 19.

In a second search unit (in-word search unit) 15, a self-transition unit 151 causes each partial hypothesis to make a self-transition in a search process. An LR transition unit 152 causes of partial hypothesis to make an RL transition in a search process. A likelihood calculation unit 153 calculates an acoustic likelihood by matching time series data of acoustic feature parameters against a lexical tree stored in a second database 20 and an acoustic model stored in a third database 21 in the self-transition and LR transition to determine an accumulated likelihood by accumulating the acoustic likelihood in a time direction. In the present embodiment, if a state sequence of the lexical tree is branched into a plurality of state sequences due to constraints of the grammar, the second search unit 15 duplicates as many partial hypotheses as the number of branches and causes each partial hypothesis to proceed for each branch to calculate a likelihood.

A reward attachment unit 154 attaches a reward R(x) according to the number x of reachable words (number of leaf nodes) to each partial hypothesis in a search process to raise the accumulated likelihood. A pruning unit 155 compares the aggregate value of the accumulated likelihood of each state in the search process and the reward R(x) at predetermined intervals to exclude partial hypotheses with less likelihood from search targets by pruning such partial hypotheses.

A word hypotheses output unit 16 outputs word hypotheses of partial hypotheses that have proceeded to the end of word. A word hypotheses accumulation unit 17 accumulates word hypotheses of all partial hypotheses that have proceeded to the end of word. Searching by the first and the second search units 14, 15 and output of word hypotheses are repeated until input of time series data of acoustic feature parameters is completed. When input of time series data is completed, a recognition result determination unit 18 traces backward to the state sequence with the greatest likelihood from among a set of word hypotheses that have reached grammatically the last HMM state to determine a recognition result.

Figure 6:
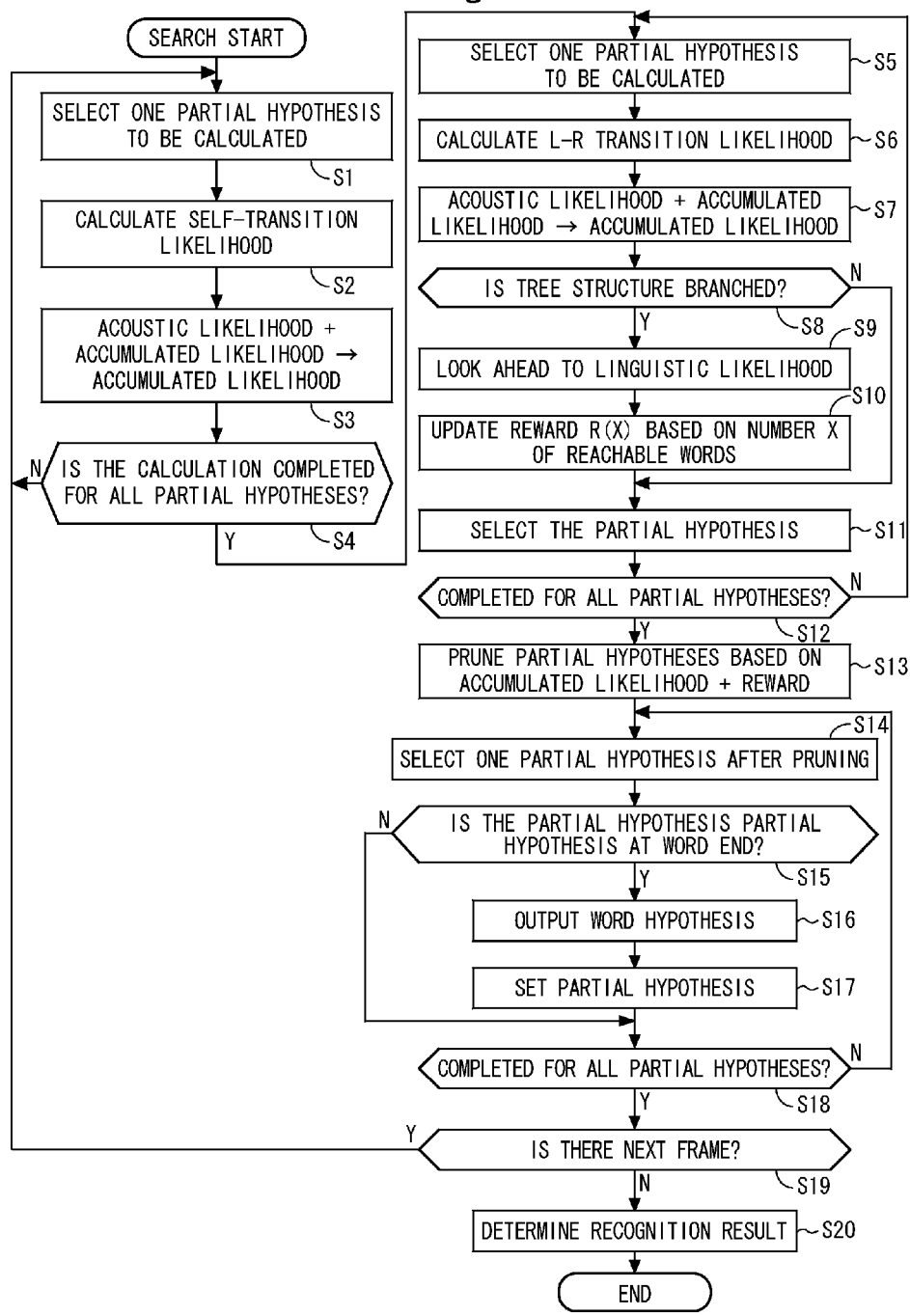
FIG. 6 is a flow chart showing a procedure for speech recognition to which the present invention is applied.
Figure 7:
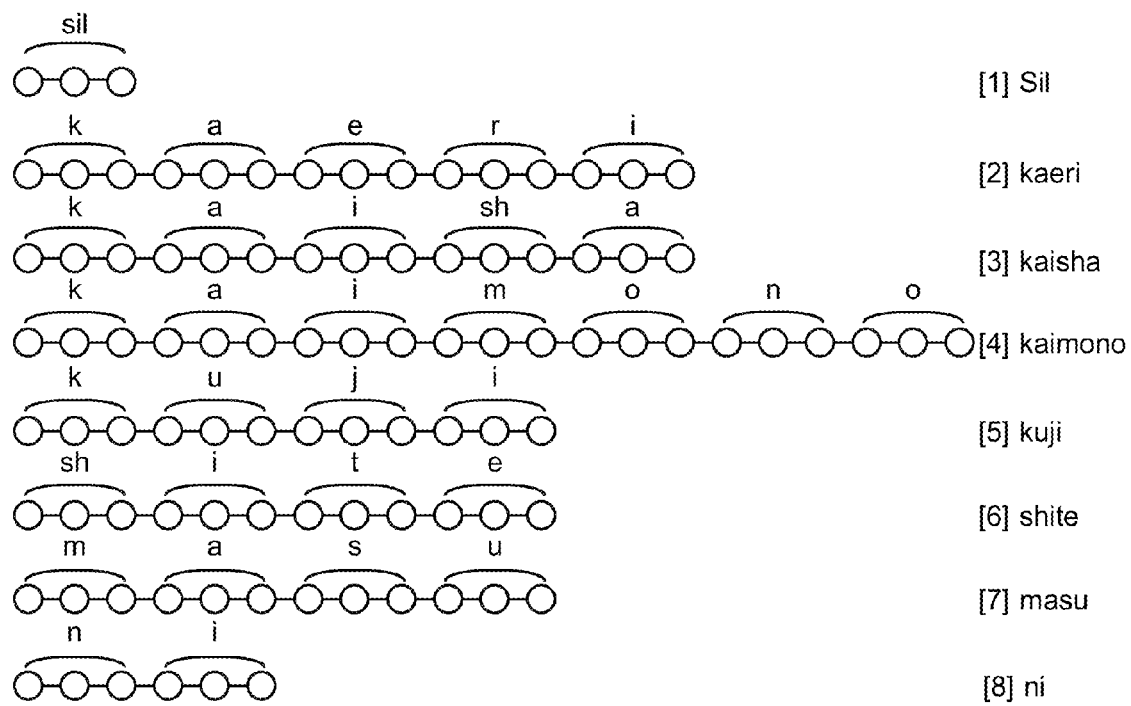
FIG. 7 is a diagram showing an example of a linear HMM sequence.
Figure 8:
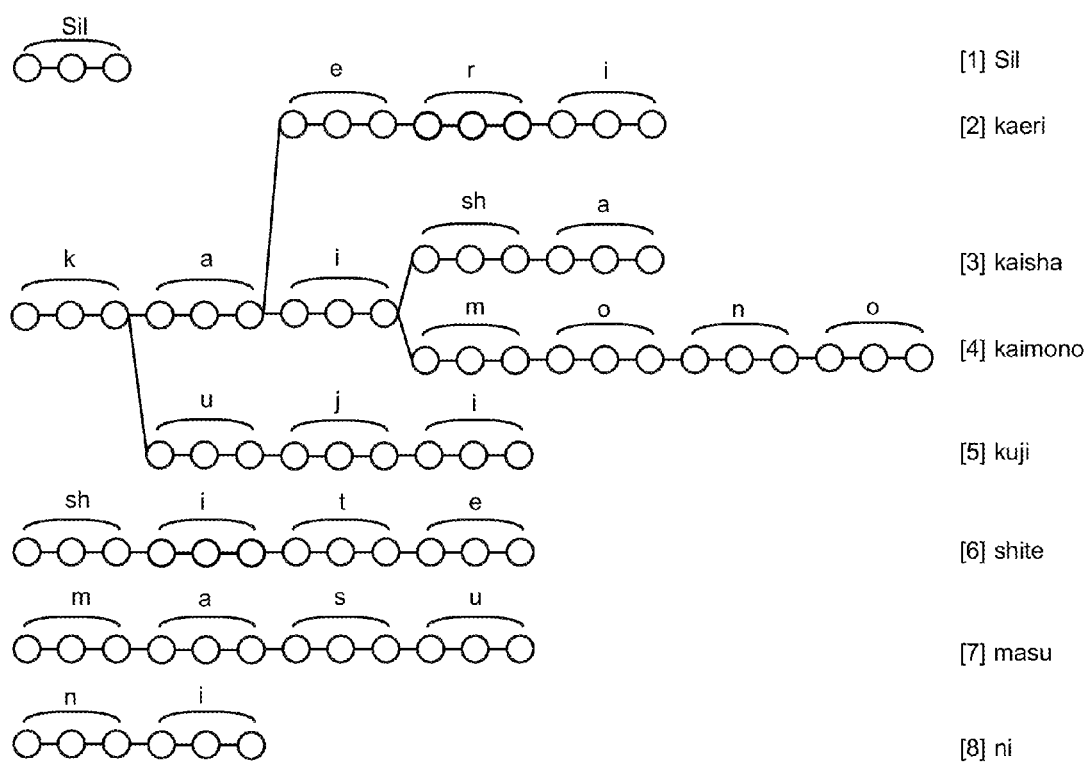
FIG. 8 is a diagram showing an example of a lexical tree.

FIG. 6 is a flow chart showing a procedure for speech recognition to which a pattern recognition method of the present invention is applied and mainly shows the operation of the second search unit 15.

In step S1, one valid partial hypothesis is selected for calculation. In step S2, the valid partial hypothesis is caused to make a self-transition to calculate an acoustic likelihood thereof. In step S3, the acoustic likelihood is added to the accumulated likelihood to date to update the accumulated likelihood. In step S4, whether the self-transition and likelihood calculation are completed for all partial hypotheses associated with this timing is determined. If not completed, the processing returns to step S1 to repeat the above processing for other partial hypotheses that should make a transition in this timing.

After the self-transition and likelihood calculation are completed for all partial hypotheses associated with this timing, the processing returns to step S5 to select one valid partial hypothesis associated with this timing again for calculation. In step S6, the valid partial is caused to make an L-R transition to calculate an acoustic likelihood thereof. In step S7, the acoustic likelihood is added to the accumulated likelihood to date to update the accumulated likelihood.

In step S8, whether the tree structure has been caused to branch by the L-R transition is determined. If the tree structure has branched, the processing proceeds to step S9 to look ahead to the linguistic likelihood based on a probabilistic language model to add the maximum value (look-ahead value) of linguistic likelihood of all reachable words to the accumulated likelihood. In step S10, the number x of words (number of leaf nodes) reachable from the transition destination is applied to Equation 1 to calculate the reward R(x) to update the registered reward R(x) to this partial hypothesis. According to Equation 1, the reward R(x) becomes "0" when the number x of reachable words is "1" and thus, the probabilistic framework of search is maintained without being pulled down. Symbols a and b are positive constants.

[Equation 1]

$$R(x) = a \cdot \left[1 - \exp\left\{-\frac{(x-1)}{b}\right\}\right] \quad (1)$$

In step S11, if a partial hypothesis of self-transition is present at the transition destination, the accumulated likelihood thereof and the accumulated likelihood of the partial hypothesis after the L-R transition are compared to leave the partial hypothesis with the greater accumulated likelihood while discarding the partial hypothesis with less accumulated likelihood. In step S12, whether the L-R transition is completed for all partial hypotheses associated with this timing is determined. If not completed, the processing returns to step S5 to repeat the above processing for other partial hypotheses that should make a transition in this timing.

Then, after the above processing is completed for all partial hypotheses that should make a transition in this timing, the processing proceeds to step S13 to perform pruning processing. In the present embodiment, the aggregate value of the accumulated likelihood and the reward R(x) is used as each likelihood $\alpha j(t)$ at time t in state j and the greatest likelihood $\alpha max(t)$ of all partial hypotheses at time t and each likelihood $\alpha j(t)$ are compared. Then, partial hypotheses satisfying Equation 2 are left in the search space in the next time and partial hypotheses satisfying Equation 3 are excluded from the search space in the next time. θpruning is a beam width.

[Equation 2]

$$\alpha_j(t) \geq \alpha_{max}(t) - \theta_{pruning} \quad (2)$$

[Equation 3]

$$\alpha_j(t) < \alpha_{max}(t) - \theta_{pruning} \quad (3)$$

In step S14, one partial hypothesis left after pruning is selected. In step S15, whether the selected partial hypothesis is a partial hypothesis at the end of word is determined. If the selected partial hypothesis is a partial hypothesis at the end of word, the processing proceeds to step S16 to output a word hypothesis. In step S17, a virtual partial hypothesis to make a transition to the start state of the next word is set. In step S18, whether the above processing is completed for all partial hypotheses left after pruning is determined. If the above processing is not completed, the processing returns to step S14 to repeat the above processing while changing the partial hypothesis. In step S19, whether the next frame is present is determined and if the next frame is present, the processing returns to step S1 to repeat the above processing for acoustic feature parameters of the next frame.

When the above processing is completed for all frames and the search reaches the frame at the end of a sentence, in step S20, all partial hypotheses that have reached grammatically the last HMM state are sorted according to the accumulated likelihood to trace backward to a plurality of partial hypotheses with top accumulated likelihood or a single partial hypothesis before a recognition result being output.

A series of pattern recognition procedures including the above search procedure can be described by a computer language that can be executed by a computer and a pattern recognition equipment can be configured by recording the program in a storage medium such as a CD-ROM and a DVD and causing the computer to read and execute the program.

In the above embodiment, the present invention is described by taking a case where partial hypotheses are pruned based on the beam width as an example, but the present invention is not limited to such an example and the present invention can similarly be applied when accumulated likelihood of partial hypotheses is represented as a histogram and partial hypotheses are pruned based on the maximum number of permissible hypotheses.

Also in the above embodiment, the present invention is described by taking speech recognition as an example, but the present invention can similarly be applied to other pattern recognition.

What is claimed is:

1. A pattern recognition equipment that matches feature parameters extracted from an input signal against a finite state machine of a tree structure in which a recognition pattern is represented by a path leading from a root to a plurality of leaf nodes to adopt the most likely state transition path reaching the leaf node as a recognition result, comprising:

means for calculating a likelihood of the feature parameters for each state of the finite state machine by matching the feature parameters of the input signal against the finite state machine;

means for calculating a reward according to a number of reachable leaf nodes from the each state so that the reward increases in value with an increasing number of leaf nodes reachable; and a pruning means for comparing aggregate values of an accumulated likelihood and the reward of partial hypotheses in each state at predetermined intervals to exclude partial hypotheses with lower aggregate values from search targets, wherein the means for calculating the reward calculates the reward by using a monotonously increasing function that increases the reward with an increasing number of reachable leaf nodes, wherein if the number of reachable leaf nodes is x and the reward is R(x), the monotonously increasing function is given a formula below, where a and b are constants, $$R(x) = a \cdot \left[1 - \exp\left\{-\frac{(x-1)}{b}\right\}\right],$$

and wherein partial hypotheses are hypotheses that save the likelihood of the feature parameters and that are temporarily stored in each state of the finite state machine.

2. The pattern recognition equipment according to claim 1, wherein the means for calculating the likelihood calculates the likelihood in each state of a transition destination by causing the partial hypotheses in each state of the finite state machine to make a self-transition and an L-R transition, and the means for calculating the reward updates the reward if the L-R transition destination is a state after branching.

3. The pattern recognition equipment according to claim 1, wherein the monotonously increasing function returns the reward "0" when the number of reachable leaf nodes is "1".

4. The pattern recognition equipment according to claim 1, wherein the monotonously increasing function causes the reward to monotonously increase and to asymptotically approach a fixed value when the number of reachable leaf nodes is more than "1".

5. The pattern recognition equipment according to claim 1, wherein the finite state machine of the tree structure is a lexical tree of words.

6. The pattern recognition equipment according to claim 5, wherein a relationship between the number of reachable leaf nodes and the reward is different according to a type of the words.

7. A pattern recognition method of matching feature parameters extracted from an input speech signal against a finite state machine of a tree structure in which a recognition pattern is represented by a path leading from a root to a plurality of leaf nodes to adopt the most likely state transition path reaching the leaf node as a recognition result, said method executed by a computer comprising:

calculating a likelihood of the feature parameters for each state of the finite state machine by matching the feature parameters of the input speech signal against the finite state machine;

calculating a reward according to a number of reachable leaf nodes from the each state; and comparing aggregate values of an accumulated likelihood and the reward of partial hypotheses in each state at predetermined intervals to exclude partial hypotheses with lower aggregate values from search targets, wherein said method calculates the reward by using a monotonously increasing function that increases the reward with an increasing number of reachable leaf nodes, wherein if the number of reachable leaf nodes is x and the reward is R(x), the monotonously increasing function is given a formula below, where a and b are constants, $$R(x) = a \cdot \left[1 - \exp\left\{-\frac{(x-1)}{b}\right\}\right],$$

and wherein partial hypotheses are hypotheses that save the likelihood of the feature parameters and that are temporarily stored in each state of the finite state machine.

8. A non-transitory computer-readable recording medium storing a pattern recognition program, executed by a computer to perform the method of claim 7.

* * * * *